United States Patent
Bai et al.

(10) Patent No.: US 9,918,365 B1
(45) Date of Patent: Mar. 13, 2018

(54) RIPPLE REMOVING CIRCUIT AND LED CONTROL CIRCUIT APPLYING THE SAME

(71) Applicant: JOULWATT TECHNOLOGY (HANGZHOU) CO., LTD., Hangzhou (CN)

(72) Inventors: Lang Bai, Hangzhou (CN); Biliang Huang, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 15/373,942

(22) Filed: Dec. 9, 2016

(30) Foreign Application Priority Data

Aug. 31, 2016 (CN) .......................... 2016 1 0795710

(51) Int. Cl.
*H05B 33/08* (2006.01)

(52) U.S. Cl.
CPC .............................. *H05B 33/0842* (2013.01)

(58) Field of Classification Search
CPC ............ H05B 33/0815; H05B 33/0818; H05B 33/0809; H05B 33/0851; H05B 33/0884; H05B 33/803; H02M 1/143; H02M 1/08; H02M 3/156; H02M 3/33507; Y02B 20/345; Y02B 20/347; G05F 1/56

USPC ........ 315/291, 294, 297, 307, 312, 224, 247
See application file for complete search history.

(56) References Cited

U.S. PATENT DOCUMENTS

| | | | | |
|---|---|---|---|---|
| 9,049,760 | B2 * | 6/2015 | Wang | H05B 33/0809 |
| 9,107,260 | B2 * | 8/2015 | Sun | H05B 33/0815 |
| 9,497,821 | B2 * | 11/2016 | Liu | F21K 9/27 |
| 9,564,795 | B2 * | 2/2017 | Jin | H02M 1/143 |
| 2017/0181234 | A1 * | 6/2017 | Huang | G05F 1/56 |
| 2017/0194856 | A1 * | 7/2017 | Bai | H02M 3/156 |

FOREIGN PATENT DOCUMENTS

| | | |
|---|---|---|
| CN | 104080256 A | 10/2014 |
| CN | 206042449 U | 3/2017 |

* cited by examiner

*Primary Examiner* — Haissa Philogene
(74) *Attorney, Agent, or Firm* — Perkins Coie LLP

(57) ABSTRACT

A ripple removing circuit and an LED control circuit applying the same are described herein. The LED control circuit receives alternating current input, converts the input into direct current with ripples and supplies power for an LED load. The direct current with ripples is connected to a positive end of the LED load, a negative end of the load is connected to a first end of a regulation tube, and a second end of the regulation tube is grounded. A first capacitor is connected between a control end of the regulation tube and the ground, and the time constant of the filter circuit formed by the first capacitor, a current generating circuit and a current source is far greater than a power frequency period. The current flowing across the regulation tube is approximately a direct current free of ripples, thereby decreasing the current ripples going across the LED load.

20 Claims, 5 Drawing Sheets

RIPPLE REMOVING CIRCUIT AND LED CONTROL CIRCUIT APPLYING THE SAME

CROSS-REFERENCE TO RELATED APPLICATIONS

This Non-provisional application claims priority under 35 U.S.C. § 119(a) on Patent Application No(s). 201610795710.7 filed in People's Republic of China on Aug. 31, 2016, the entire contents of which are hereby incorporated by reference.

BACKGROUND OF THE INVENTION

Field of the Invention

This invention relates to the technical field of power electronics and, more particular, to a ripple removing circuit and a light emitting diode (LED) control circuit applying the same.

Description of the Related Art

In the prior art, the mode where a light emitting diode (LED) driving circuit receives alternating current input and converts the input into direct current power output with sine ripples is mostly adopted for LED driving. As shown in FIG. 1, when the LED driving circuit has a power factor correction function, ripples at the output end are larger. Therefore, direct voltage and direct current with secondary power frequency ripples exist on an LED load. The ripples on the LED hurt human eyes, and thus the LED load is often required to filter out the sine ripples carried by the current in actual application.

Large electrolytic capacitors are mainly adopted to serve as C01 in the prior art, are high in cost and do not facilitate circuit integration. Meanwhile, since the output power of the LED driving circuit contains sine ripples, in order to filter out the sine ripples of the current, output voltage is required to be controlled to include voltage waveforms containing sine ripples so as to ensure that the product of the LED current and the output voltage is equal to the output power of the LED driving circuit. In the prior art, the current of the LED load is mainly controlled to be a direct current approximately containing no ripples through a constant current control circuit with a filter capacitor, and meanwhile the sine ripples in the output voltage are exerted to both ends of the constant current control circuit so as to ensure that the voltages at both ends of the LED load remain approximately unchanged. In the prior art, the shortcoming of filter capacitor control or adoption of a fixed current charge-discharge mode is low in response speed, the direct current of the LED load carries triangular ripples, ripple amplitude is fixed, and the ripple proportion is very large when the average current is small.

BRIEF SUMMARY OF THE INVENTION

In view of this, the present invention aims at providing a ripple removing circuit for removing load voltage and current ripples and an LED control circuit applying the same, solving the technical problem of current ripple elimination which cannot be solved in the prior art.

The technical scheme of the present invention is to provide a ripple removing circuit with the following circuit structure, comprising:

a regulation tube in serial connection with a load, a first end of the regulation tube being connected with the load, and a second end of the regulation tube being connected with a low potential end of an input voltage;

a first capacitor, both ends of the first capacitor being connected with a control end and the second end of the regulation tube, respectively;

a current source in parallel connection with the first capacitor; and a current generating circuit, wherein input ends of the current generating circuit are connected with a high potential end and a low potential end, respectively, the first end of the regulation tube serves as the high potential end of the current generating circuit, and a common end of the first capacitor and the current source or a ground potential end serves as the low potential end of the current generating circuit; a current generated by the current generating circuit is regulated according to voltages at the high potential end and the low potential end; and an output end of the current generating circuit is connected with the common end of the first capacitor and the current source.

Preferably, the second end of the regulation tube may be connected to the low potential end of the input voltage through a first resistor, and one end of the first capacitor may be connected with the second end of the regulation tube through the first resistor.

Preferably, one end of the first capacitor may be connected with the control end of the regulation tube through a first operational amplifier, a first input end of the first operational amplifier may be connected with the first capacitor, the second input end of the first operational amplifier may receive a current sampling signal representing instantaneous current flowing across the regulation tube, and the output end of the first operational amplifier may be connected with the control end of the regulation tube.

Preferably, the ripple removing circuit may further comprise a nonlinear regulation circuit, the nonlinear regulation circuit may charge or discharge the first capacitor according to the comparison difference of the current generated by the current generating circuit and the current source.

Preferably, the charging or discharging current may be in a proportional relation with the difference of the current generated by the current generating circuit and the current source.

Preferably, the input end of the nonlinear regulation circuit may be connected with the common end of the current generating circuit and the current source, and the output end of the nonlinear regulation circuit may be connected with the first capacitor.

Preferably, when the current i02 generated by the current generating circuit may be greater than the current i01 of the current source, a charging current for the first capacitor of the nonlinear regulation circuit may be M*(i02−i01); when the current i02 generated by the current generating circuit may be smaller than the current i01 of the current source I01, the discharging current for the first capacitor of the nonlinear regulation circuit may be N*(i01−i02).

Preferably, N/M may be greater than or equal to 1.

Preferably, the current generating circuit may be a second resistor, and both ends of the second resistor may be respectively connected with the first end of the regulation tube and the common end of the current source and the first capacitor.

Preferably, the current generating circuit may comprise a voltage-to-current conversion circuit and a current mirror module, the input end of the voltage-to-current conversion circuit may be connected with the first end of the regulation tube, the other end of the voltage-to-current conversion circuit may be connected with the current mirror module, and the output end of the current mirror module may be connected with the common end of the current source and the first capacitor.

According to another solution scheme of the present invention, an LED control circuit with the following structure is provided. The LED control circuit comprises an LED driving circuit and any one ripple removing circuit mentioned above, the LED driving circuit receives alternating current input and then supplies power for an LED load, and the ripple removing circuit is coupled to the LED driving circuit.

Compared with the prior art, by the adoption of the circuit structure of the present invention, the present invention has the following advantages that the LED control circuit receives alternating current input, converts the input into direct current with ripples and supplies power for the LED load. The direct current with ripples is connected to the positive end of the LED load, the negative end of the LED load is connected to the first end of the regulation tube, and the second end of the regulation tube is grounded; a first capacitor is connected between the control end of the regulation tube and the ground, and the time constant of a filter circuit formed by the first capacitor, the current generating circuit and the current source is far greater than a power frequency period. Therefore, the voltage on the first capacitor is approximately a DC voltage free of ripples, so that the current flowing across the regulation tube is approximately a direct current free of ripples, thereby decreasing the current ripples going across the LED load, and input current ripples are converted into voltage ripples at the drain-source end of the regulation tube by the input capacitor. A DC component of the voltage ripples at the drain-source end of the regulation tube can be controlled by setting the value of the current of the current source. The ripple removing effect is remarkable, and the implementation costs are low. Due to the fact that the input of the current generating circuit is connected to the first end of the regulation tube and the output of the current generating circuit is connected to the first capacitor, when the load changes, the voltage at the first end of the regulation tube changes, the voltage on the first capacitor can rapidly reflect the load change, and the system responds rapidly.

DETAILED DESCRIPTION OF THE INVENTION

The preferred embodiments of the present invention are described in detail below in combination with accompanied drawings, but the present invention is not limited to these embodiments. The present invention covers any substitutive, modified and equivalent methods and schemes employed within the spirit and scope of the present invention.

For making the public thoroughly understand the present invention, the specific details are described in the following preferred embodiment of the present invention, while those skilled in the art can also completely understand the present invention without the descriptions of these details.

The present invention is described in detail in the following paragraphs with reference to the accompanied drawings by way of examples. It should be explanatory that the accompanied drawings are in a simplified form, employ the non-accurate proportions and are only used for the purpose of conveniently and clearly assisting the description of the embodiments of the present invention.

Figure 1:
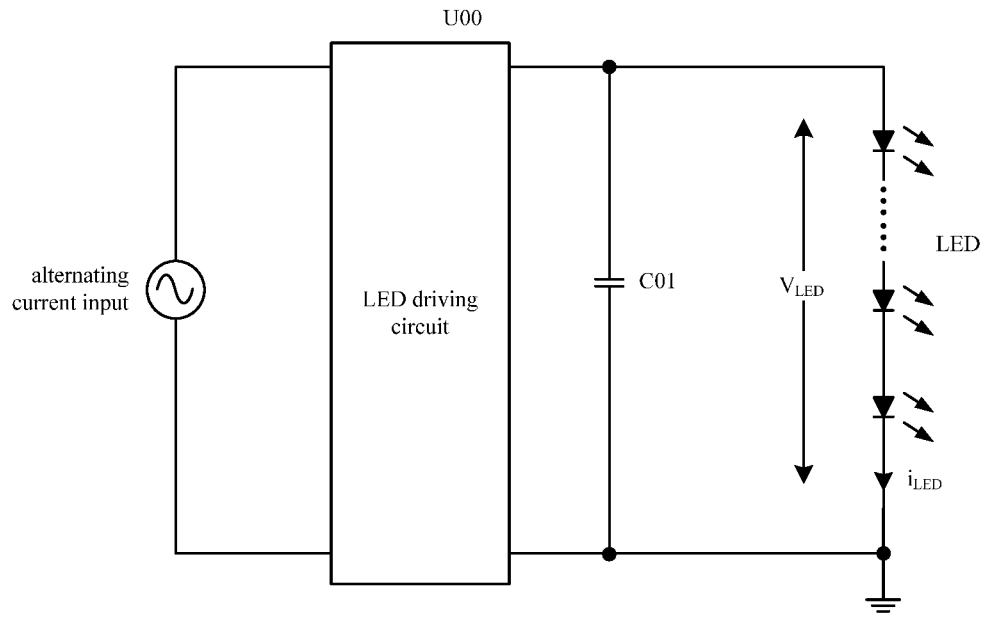
FIG. 1 is a circuit structure diagram of an LED control circuit in the prior art.
Figure 2:
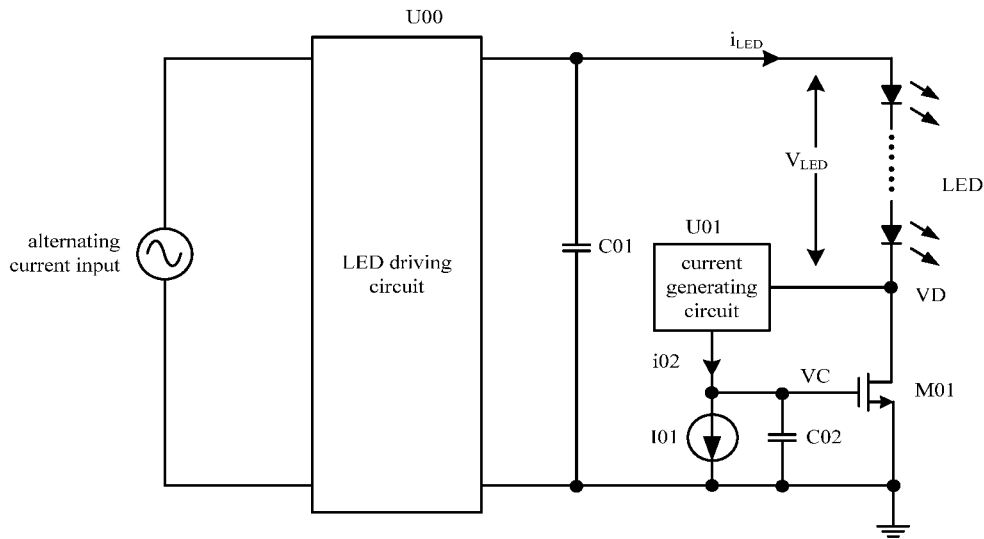
FIG. 2 is a circuit structure diagram of the first embodiment of a ripple removing circuit of the present invention.

As shown in FIG. 2, a circuit structure of the first embodiment of the present invention is illustrated. An LED driving circuit receives alternating current input, converts the input into direct current with ripples and supplies power for an LED load. A direct current power is connected to a positive end of the LED load, and a negative end of the LED load is connected with a ripple removing circuit of the present invention. In this embodiment, the ripple removing circuit includes a regulation tube M01, a current generating circuit U01, a current source I01, and a first capacitor C02. The regulation tube M01 in this embodiment is a Negative Channel-Metal-Oxide-Semiconductor (NMOS), the first end of the regulation tube M01 is a drain electrode, the second end of the regulation tube M01 is a source electrode, and the control end of the regulation tube M01 is a grid electrode. The negative end of the LED load is connected to the drain electrode (namely the first end) of the regulation tube M01, and the source electrode (namely the second end) of the regulation tube M01 is grounded. The current generating circuit U01 is connected between the drain electrode and the grid electrode (namely a control end) of the regulation tube M01. The current source I01 and the first capacitor C02 are connected in parallel and are connected between the grid electrode of the regulation tube M01 and the ground.

Take the LED as the load for example for the description. The first capacitor C02 is connected between the grid electrode of the regulation tube M01 and the ground, and the first capacitor C02 and the current generating circuit U01 forms a filter circuit. When the system is balanced or after the system is in a steady state, the current i02 generated by the current generating circuit U01 is equal to the current i01 of the current source I01, and the time constant of the filter circuit is far greater than the power frequency period. Therefore, a voltage VC on the first capacitor C02 is approximately a direct current (DC) voltage free of ripples, so that the current flowing across the regulation tube M01 is approximately a direct current free of ripples, thereby decreasing the current ripples going across the LED load, and input current ripples are converted into voltage ripples at the drain-source end of the regulation tube M01 by an input capacitor C01. The DC component of the voltage ripples at the drain-source end of the regulation tube M01 can be controlled by setting the value of the current i01 of the current source I01. That is, the current generating circuit U01 generates the current i02 according to the difference between a voltage VD and the voltage VC. An average value of the current i02 is equal to the current value of the current source I01, the larger the current of the current source I01 is set, the greater the average value of the current i02 converted based on the voltage difference is, and the higher the voltage VD is. Accordingly, the DC component regulation is achieved.

Figure 3:
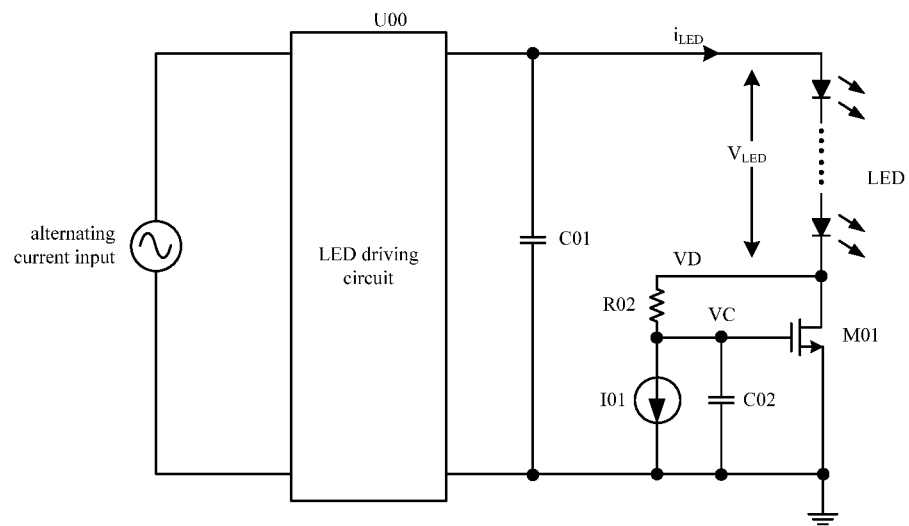
FIG. 3 is a circuit structure diagram of the second embodiment of the ripple removing circuit of the present invention.

As shown in FIG. 3, a circuit structure of the second embodiment of the present invention is illustrated. This embodiment is improved based on the first embodiment, and the main difference lies in that the current generating circuit U01 is defined. That is, a second resistor R02 is adopted to serve as the current generating circuit, and two ends of the current generating circuit are connected for receiving the voltages VD and VC, respectively. The current across the second resistor R02 depends on the voltage difference between the voltages VD and VC, and accordingly the current i02 is obtained. Other corresponding descriptions can refer to the description of the first embodiment.

Figure 4:
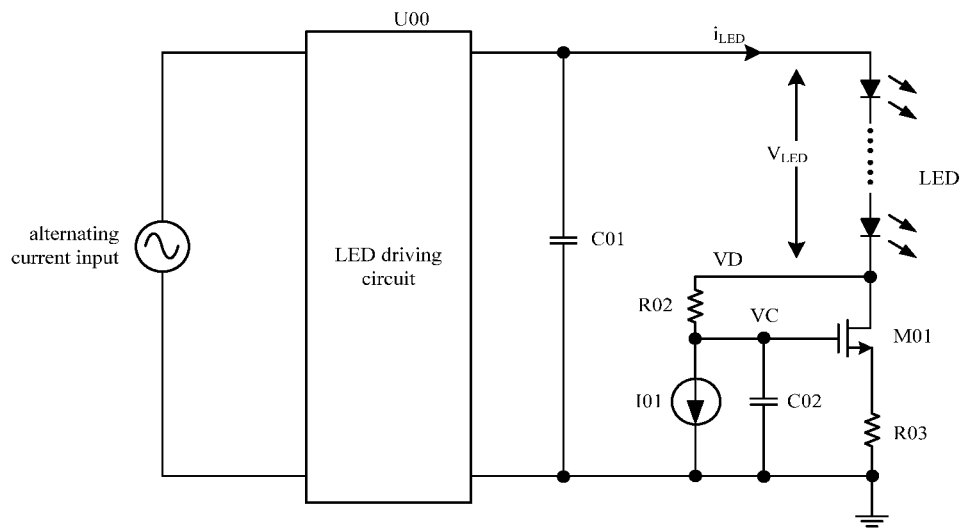
FIG. 4 is a circuit structure diagram of the third embodiment of the ripple removing circuit of the present invention.

As shown in FIG. 4, a circuit structure of the third embodiment of the present invention is illustrated. This embodiment is improved based on the first embodiment and the second embodiment, and the main difference lies in that a first resistor R03 is added. One end of the first resistor R03 is connected with the source electrode of the regulation tube M01, and the other end of the first resistor R03 is grounded. Due to the fact that the first resistor R03 is added, the ripple removing effect can be improved. Although the current generating circuit U01 is also defined as the second resistor R02 in this embodiment, it can also be like the first embodiment in which the current generating circuit is not limited. That is, other circuits except the second resistor R02 can be adopted for implementation.

Figure 5:
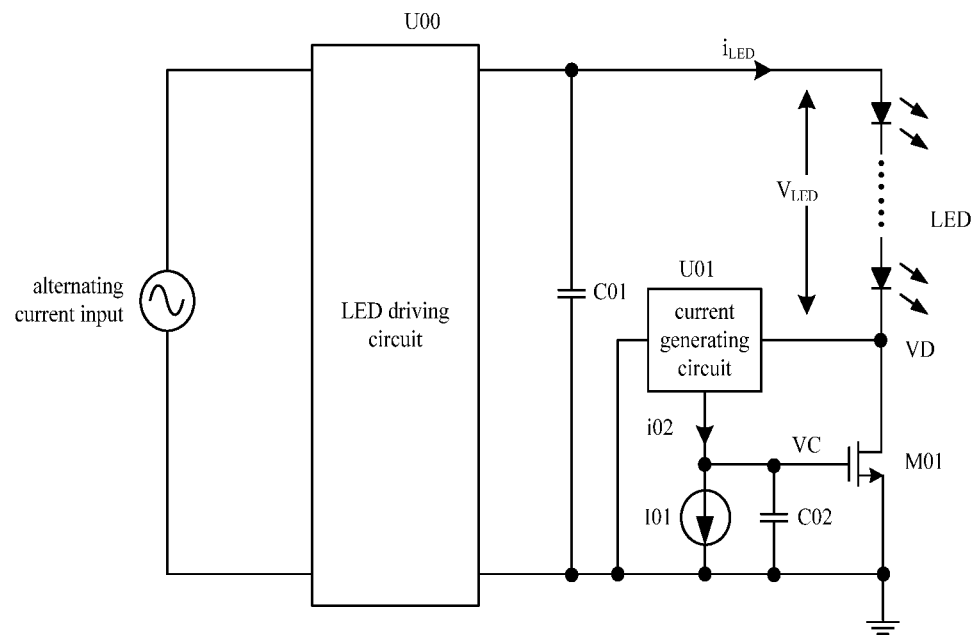
FIG. 5 is a circuit structure diagram of the fourth embodiment of the ripple removing circuit of the present invention.

As shown in FIG. 5, a circuit structure of the fourth embodiment of the present invention is illustrated. This embodiment is improved based on the first embodiment, and the main difference lies in that the output current i02 of the current generating circuit U01 is not controlled according to the voltage difference between the voltages VD and VC but is directly controlled by the voltage VD, namely the voltage difference between the voltage VD and the ground. Accordingly, the current generating circuit U01 needs connection to the ground. Wherein, the input end of the current generating circuit is connected with the VD end and the ground, and the current output end of the current generating circuit is connected to the voltage VC. The current i02 generated by the current generating circuit is in direct proportion to the voltage between the voltage VD and the ground, namely i02=k1*VD. During balance, $\overline{i02}$=i01, wherein $\overline{i02}$ is the average value of the current i02, and the average value of the voltage VD $\overline{VD}$=$\overline{i02}$/k1=i01/k1.

Figure 6:
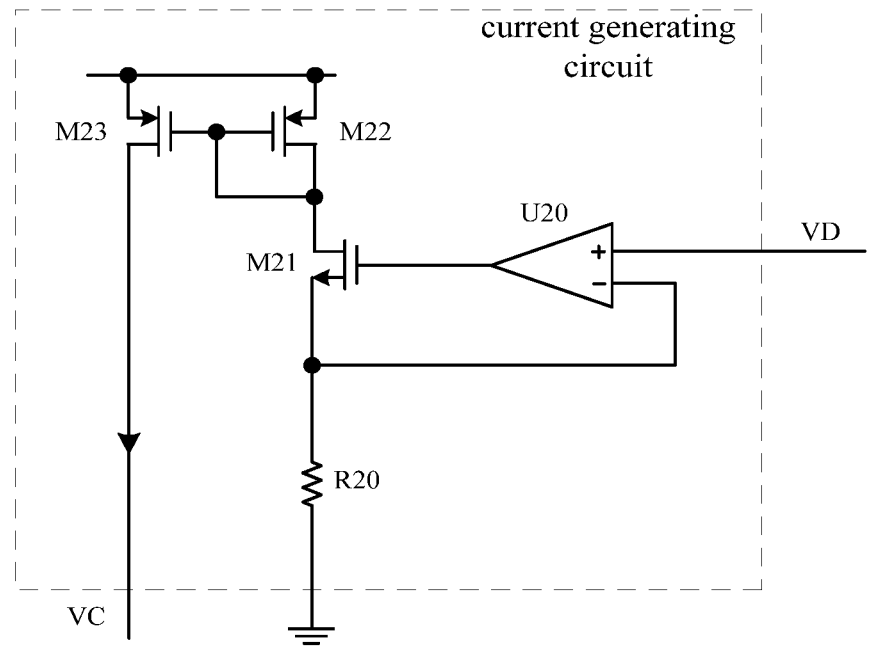
FIG. 6 is a circuit structure diagram of a current generating circuit of the present invention.

As shown in FIG. 6, an implementation mode of the current generating circuit of the fourth embodiment of the present invention is illustrated. The current generating circuit includes a voltage-to-current conversion circuit and a current mirror module. The input end of the voltage-to-current conversion circuit is connected with the first end of the regulation tube, the other end of the voltage-to-current conversion circuit is connected with the current mirror module, and the output end of the current mirror module is connected with a common end of the current source and the first capacitor. Specifically, the voltage-to-current conversion circuit includes an operational amplifier U20 and a switch tube M21, the voltage VD is connected to the positive input end of the operational amplifier U20, one end of the resistor R20 is connected to the negative input end of the operational amplifier U20, and the other end of the resistor R20 is grounded; the output end of the operational amplifier U20 is connected to a control end of the switch tube M21, a source electrode of the switch tube M21 is connected to the negative input end of the operational amplifier, namely the common end connected with the operational amplifier U20 and the resistor R20. A drain electrode of the switch tube M21 is connected to the input end of the current mirror module consisting of a switch tube M22 and a switch tube M23, and both the switch tube M22 and the switch tube M23 are Positive Channel Metal Oxide Semiconductor (PMOS). The output end of the current mirror module is the output end of the current generating circuit. The result of dividing the breadth length ratio of the M22 by the breadth length ratio of the M23 is supposed to be k2, and the output current of the current generating circuit is k2*VD/R20, namely k1=k2/R20. Therefore, k1 can be obtained by selecting an appropriate coefficient k2 and the resistor R20. Although the structure shown in FIG. 6 is achieved based on the voltage VD serving as the control voltage, the voltage difference between the voltages VD and VC can also serve as the control voltage for achievement.

Figure 7:
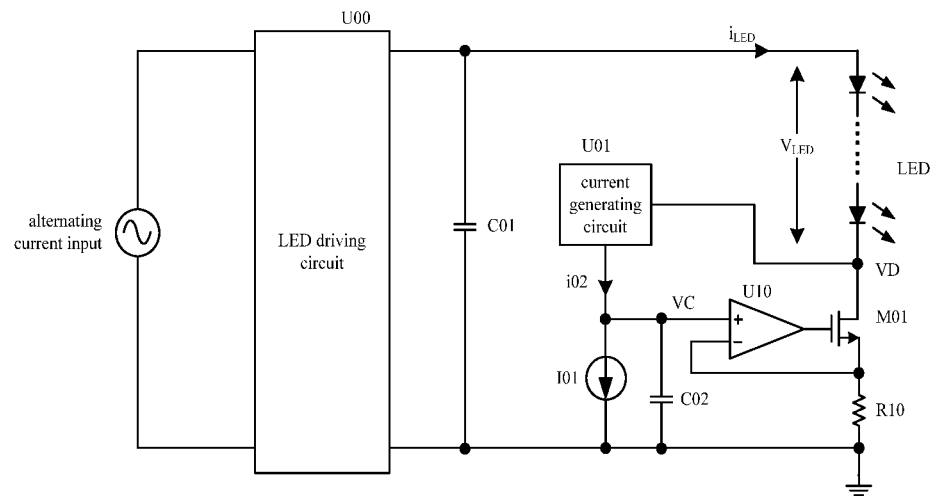
FIG. 7 is a circuit structure diagram of the fifth embodiment of the ripple removing circuit of the present invention.

As shown in FIG. 7, a circuit structure of the fifth embodiment of the present invention is illustrated. That is, this embodiment can be improved based on all the above embodiments. An operational amplifier U10 and a current sampling resistor R10 are added. At the same time, the current sampling resistor R10 can also play the effect of the first resistor R03 in FIG. 4, but a corresponding resistance value can be varied. Therefore, the current sampling resistor R10 in this embodiment can also be defined as the first resistor in the claims. In other words, the first resistor R03 in FIG. 4 can also simultaneously serve as the sampling resistor.

The positive end of the first capacitor C02, namely the VC end is connected to the positive input end of the operational amplifier U10, the source electrode of the regulation tube M01 is connected to the ground through the current sampling resistor R10. The common end of the current sampling resistor R10 and the regulation tube M01 is connected to the negative input end of the operational amplifier U10, and the output end of the operational amplifier U10 is connected to the grid electrode of the regulation tube M01. The operational amplifier U10 and the current sampling resistor R10 are added. Due to the fact that the voltage VC can be approximately a DC voltage, The voltage on the current sampling resistor R10 representing current flowing across the regulation tube is equal to the voltage VC and is approximately the DC voltage. That is, the current across the LED is approximately a direct current, the ripple removing effect can be further improved.

Figure 8:
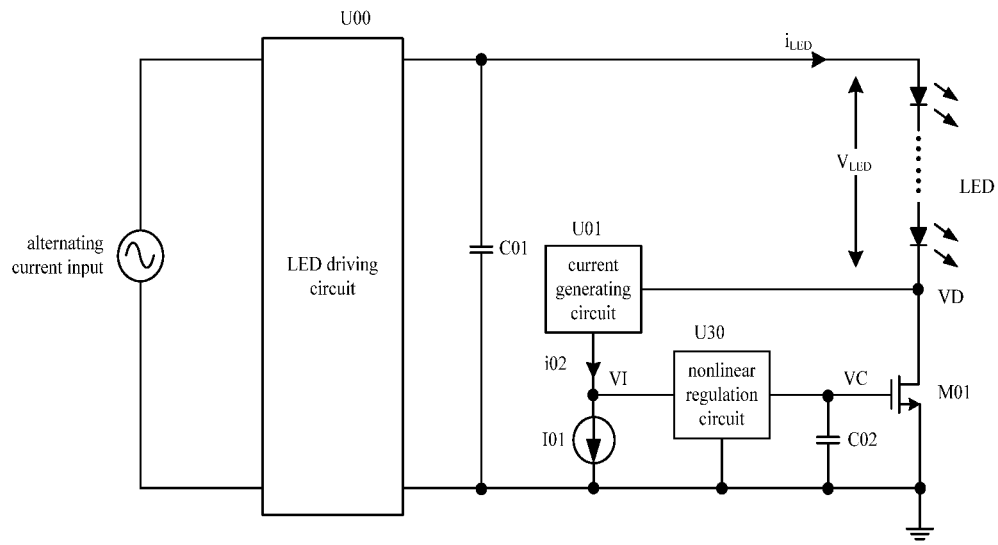
FIG. 8 is a circuit structure diagram of the sixth embodiment of the ripple removing circuit of the present invention.

As shown in FIG. 8, a circuit structure of the sixth embodiment of the present invention is illustrated. In the above embodiments, the common end of the current generating circuit and the current source I01 can be connected to the first capacitor C02 through the nonlinear regulation circuit U30. A detailed description is given by adding the nonlinear regulation circuit U30 in the scheme recorded in FIG. 2 of the first embodiment.

The input end of the nonlinear regulation circuit is connected with the common end of the current generating circuit and the current source, and the output end of the nonlinear regulation circuit is connected with the first capacitor. The charge or discharge of the first capacitor C02 is regulated by adding the nonlinear regulation circuit U30, and the value, approximate to a valley bottom, of the voltage VD or the voltage difference between the voltages VD and VC can be controlled to be a fixed value when the input current ripples change, the ripple removing circuit can always effectively remove the ripples. Further, a control value of the voltage VD or VD-VC can be set as a smaller value so as to reduce the loss of the regulation tube M01, such that this scheme has a self-adaption function for the input current ripples.

One implementation mode of the nonlinear regulation circuit is that when the current i02 generated by the current generating circuit U01 is greater than the current i01 of the current source I01, the charging current for the first capacitor C02 from the nonlinear regulation circuit U30 is M*(i02−i01); when the current i02 generated by the current generating circuit U01 is smaller than the current i01 of the current source I01, the discharging current for the first capacitor C02 from the nonlinear regulation circuit U30 is N*(i01−i02). M and N may be integers or decimals, and the value of M may be the same as or different from the value of N. N/M is greater than or equal to 1. Due to the fact that charge and discharge of the first capacitor C02 are balanced, when N/M is greater than 1, the value smaller than the average value of the current i02 but greater than the valley bottom value of the current i02 is controlled to be equal to i01. The greater the N/M value is, the more the value controlled to be equal to i01 is approximate to the valley bottom value of the current i02; if the N/M value is equal to 1, the average value of the current i02 is controlled to be equal to i01. The advantage brought by the fact that the value, approximate to the valley bottom, of the current i02 is controlled to be equal to i01 is that since the waveforms of the current i02 reflect the waveforms of the voltage VD or the voltage difference between the voltages VD and VC, the value, approximate to the valley bottom, of the voltage VD or the voltage difference between the VD and VC is controlled to be a fixed value. In other words, during balance or in the steady state, on the premise that the regulation tube M01 is ensured working in a saturation zone, the voltage at the first end of the regulation tube M01 is lower, and the energy loss of the regulation tube can be reduced.

Figure 9:
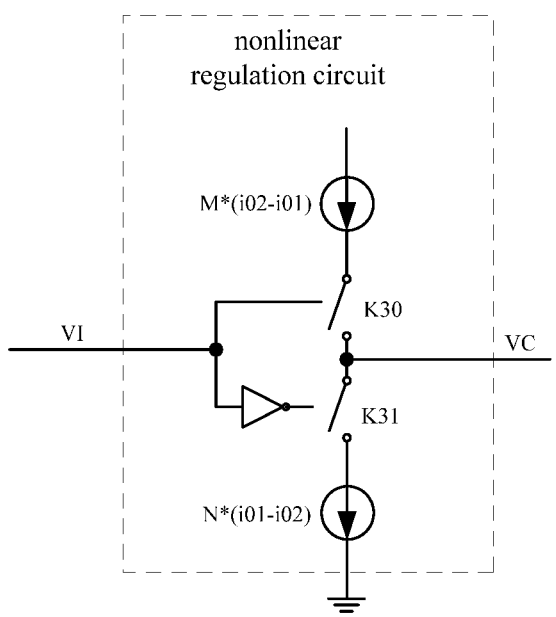
FIG. 9 is a circuit structure diagram of a nonlinear regulation circuit.

As shown in FIG. 9, a schematic circuit diagram of one implementation mode of the nonlinear regulation circuit is illustrated. The input end VI of the nonlinear regulation circuit U30 is connected with the common end of the current generating circuit and the current source I01, and the output end of the nonlinear regulation circuit U30 is connected with the first capacitor C02. When the current i02 is greater than i01, a switch K30 is switched on, a switch K31 is switched off, and the current source with value of M*(i02−i01) charges the VC end; when the current i02 is smaller than i01, the switch K31 is switched on, and the current source with value of N*(i01−i02) discharges the VC.

In addition to this, although the above embodiments are described and illustrated separately, regarding partial common technologies, those ordinarily skilled in the art can substitute and integrate the embodiments, and for the unclearly recorded contents of any one of the embodiments, another recorded embodiment can be referred to.

The above embodiments do not limit the protection scope of the technical scheme. Any modification, equivalent alternation and improvement employed under the spirit and principle of the embodiments should be within the protection scope of the technical scheme.

What is claimed is:

1. A ripple removing circuit, comprising:
    a regulation tube in serial connection with a load, a first end of the regulation tube being connected with the load, and a second end of the regulation tube being connected with a low potential end of an input voltage;
    a first capacitor, both ends of the first capacitor being connected with a control end and the second end of the regulation tube, respectively;
    a current source in parallel connection with the first capacitor; and
    a current generating circuit, wherein input ends of the current generating circuit are connected with a high potential end and a low potential end, respectively, the first end of the regulation tube serves as the high potential end of the current generating circuit, and a common end of the first capacitor and the current source or a ground potential end serves as the low potential end of the current generating circuit; a current generated by the current generating circuit is regulated according to voltages at the high potential end and the low potential end; and an output end of the current generating circuit is connected with the common end of the first capacitor and the current source.

2. The ripple removing circuit according to claim 1, wherein the second end of the regulation tube is connected to the low potential end of the input voltage through a first resistor, and one end of the first capacitor is connected with the second end of the regulation tube through the first resistor.

3. The ripple removing circuit according to claim 1, wherein one end of the first capacitor is connected with the control end of the regulation tube through a first operational amplifier, a first input end of the first operational amplifier is connected with the first capacitor, a second input end of the first operational amplifier receives a current sampling signal representing instantaneous current flowing across the regulation tube, and an output end of the first operational amplifier is connected with the control end of the regulation tube.

4. The ripple removing circuit according to claim 1, further comprising a nonlinear regulation circuit, wherein the nonlinear regulation circuit charges or discharges the first capacitor according to a comparison difference between the current generated by the current generating circuit and a current of the current source.

5. The ripple removing circuit according to claim 2, further comprising a nonlinear regulation circuit, wherein the nonlinear regulation circuit charges or discharges the first capacitor according to a comparison difference between the current generated by the current generating circuit and a current of the current source.

6. The ripple removing circuit according to claim 3, further comprising a nonlinear regulation circuit, wherein the nonlinear regulation circuit charges or discharges the first capacitor according to a comparison difference between the current generated by the current generating circuit and a current of the current source.

7. The ripple removing circuit according to claim 4, wherein a charging or discharging current is in proportional relation with the difference between the currents generated by the current generating circuit and the current source.

8. The ripple removing circuit according to claim 4, wherein an input end of the nonlinear regulation circuit is connected with the current generating circuit and the common end of the current source, and an output end of the nonlinear regulation circuit is connected with the first capacitor.

9. The ripple removing circuit according to claim 4, wherein when the current i02 generated by the current generating circuit is greater than the current i01 of the current source, a charging current for the first capacitor of the nonlinear regulation circuit is $M*(i02-i01)$; and when the current i02 generated by the current generating circuit is smaller than the current of the current source i01, a discharging current for the first capacitor of the nonlinear regulation circuit is $N*(i01-i02)$.

10. The ripple removing circuit according to claim 7, wherein N/M is greater than or equal to 1.

11. The ripple removing circuit according to claim 1, wherein the current generating circuit is a second resistor, and two ends of the second resistor are connected with the first end of the regulation tube and the common end of the current source and the first capacitor, respectively.

12. The ripple removing circuit according to claim 2, wherein the current generating circuit is a second resistor, and two ends of the second resistor are connected with the first end of the regulation tube and the common end of the current source and the first capacitor, respectively.

13. The ripple removing circuit according to claim 3, wherein the current generating circuit is a second resistor, and two ends of the second resistor are connected with the first end of the regulation tube and the common end of the current source and the first capacitor, respectively.

14. The ripple removing circuit according to claim 1, wherein the current generating circuit comprises a voltage-to-current conversion circuit and a current mirror module, an input end of the voltage-to-current conversion circuit is connected with the first end of the regulation tube, the other end of the voltage-to-current conversion circuit is connected with the current mirror module, and an output end of the current mirror module is connected with the common end of the current source and the first capacitor.

15. An LED control circuit, comprising an LED driving circuit and the ripple removing circuit as claimed in claim 1, the LED driving circuit receiving alternating current input and then supplying power for an LED load, and the ripple removing circuit being coupled to the LED driving circuit.

16. An LED control circuit, comprising an LED driving circuit and the ripple removing circuit as claimed in claim 2, the LED driving circuit receiving alternating current input and then supplying power for an LED load, and the ripple removing circuit being coupled to the LED driving circuit.

17. An LED control circuit, comprising an LED driving circuit and the ripple removing circuit as claimed in claim 3, the LED driving circuit receiving alternating current input and then supplying power for an LED load, and the ripple removing circuit being coupled to the LED driving circuit.

18. An LED control circuit, comprising an LED driving circuit and the ripple removing circuit as claimed in claim 4, the LED driving circuit receiving alternating current input and then supplying power for an LED load, and the ripple removing circuit being coupled to the LED driving circuit.

19. An LED control circuit, comprising an LED driving circuit and the ripple removing circuit as claimed in claim 5, the LED driving circuit receiving alternating current input and then supplying power for an LED load, and the ripple removing circuit being coupled to the LED driving circuit.

20. An LED control circuit, comprising an LED driving circuit and the ripple removing circuit as claimed in claim 5, the LED driving circuit receiving alternating current input and then supplying power for an LED load, and the ripple removing circuit being coupled to the LED driving circuit.

* * * * *